Feb. 10, 1953 P. A. CURTIS 2,627,978
FLOATING THICKENER
Filed Dec. 27, 1948 2 SHEETS—SHEET 1
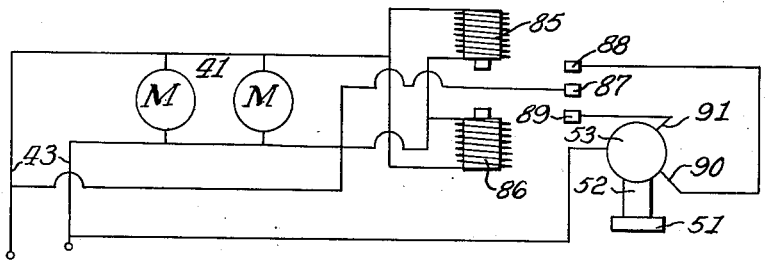
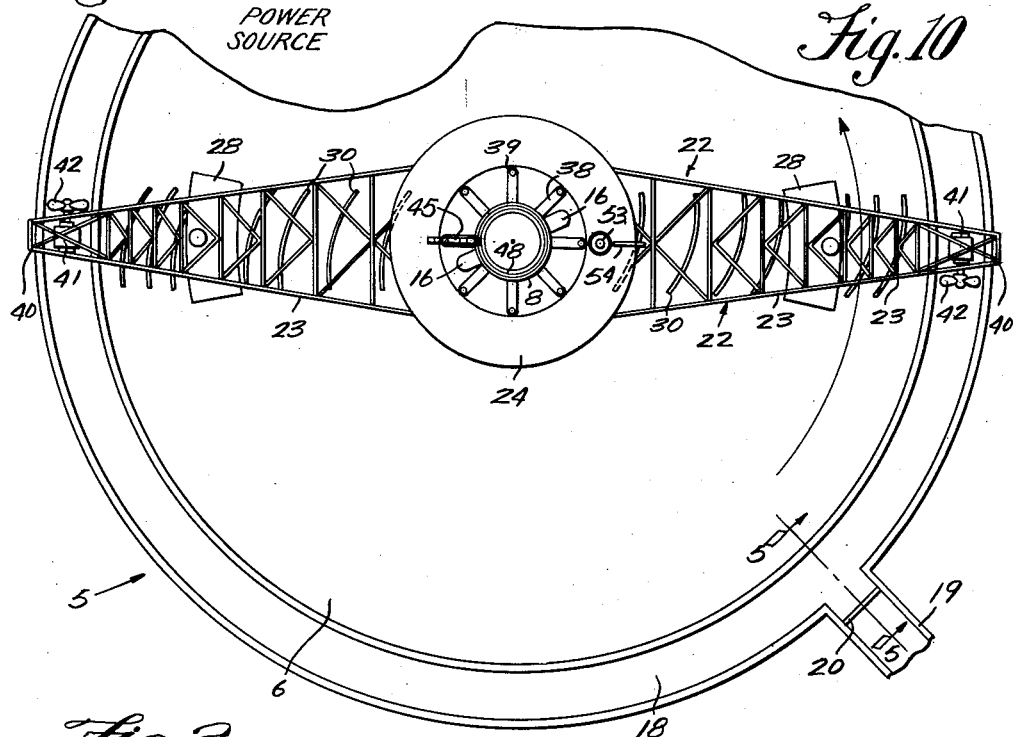
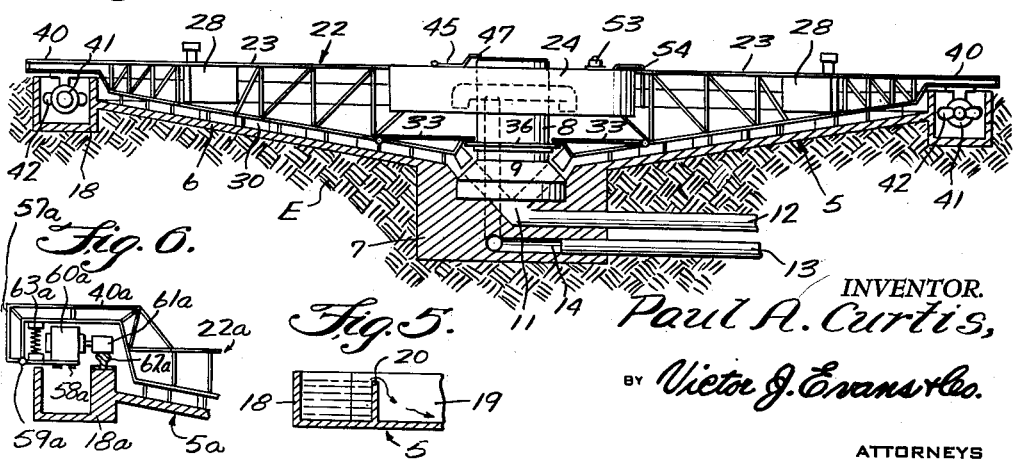
INVENTOR.
Paul A. Curtis,
BY Victor J. Evans & Co.
ATTORNEYS

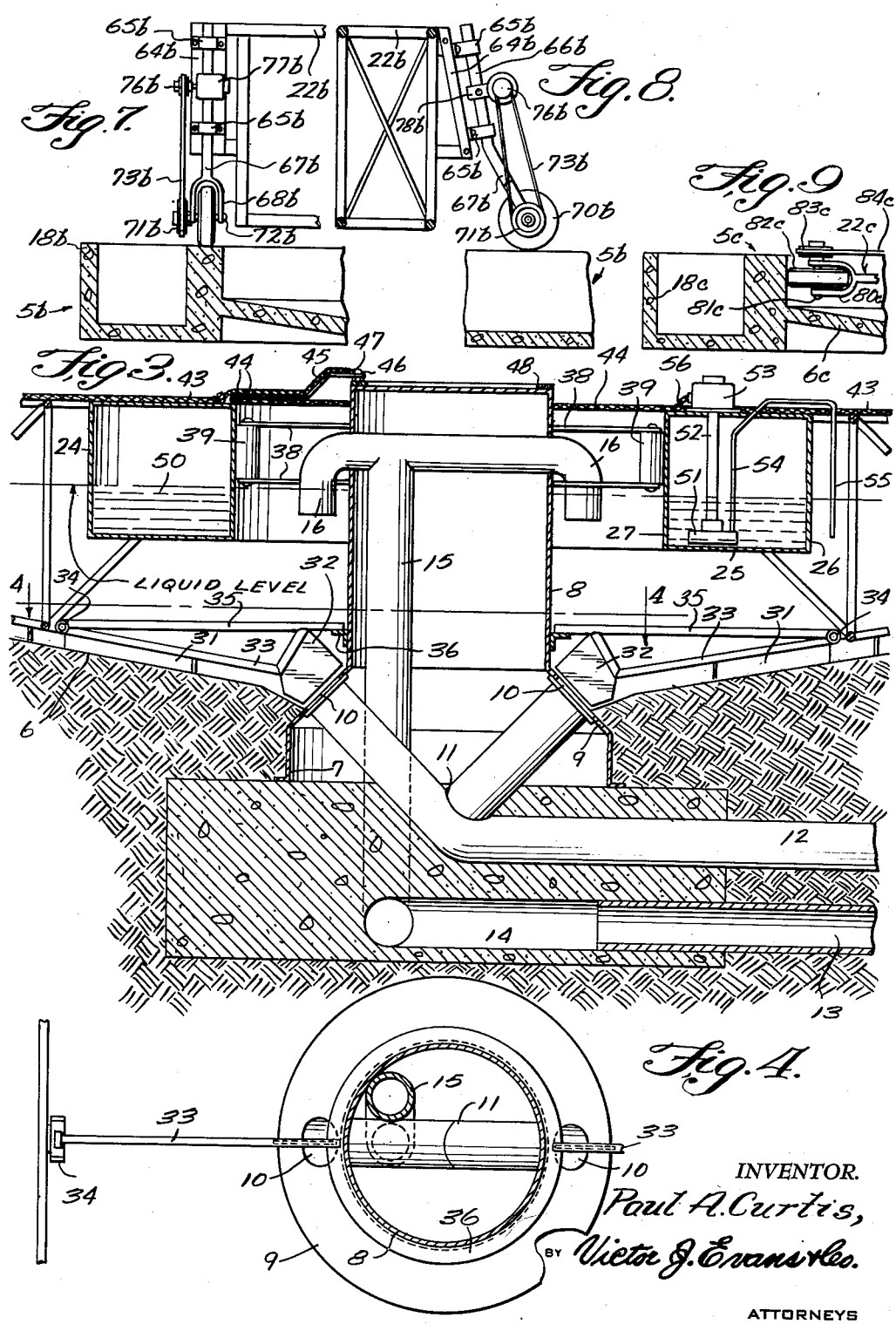

Patented Feb. 10, 1953

2,627,978

UNITED STATES PATENT OFFICE 2,627,978

FLOATING THICKENER

Paul Aivie Curtis, Lakeland, Fla.

Application December 27, 1948, Serial No. 67,511

5 Claims. (Cl. 210—55)

The present invention relates to improvements in liquid separation and purifying apparatus, and more particularly to hydroseparators, thickeners and other types of decanting apparatus for removing sludge and solid particles from liquids.

One object of the invention is to provide a liquid separation and purifying apparatus having radially extending rake arms which are floatingly and buoyantly mounted to permit the arm rakes to be raised and lowered depending upon the consistency load encountered by said rakes.

Another object is to provide a liquid separation and purifying apparatus such as a thickener with radially extending arms for supporting rakes for directing the solid material toward the center of the tank and to mount said rake supporting arms on pontoons or other floats within the tank to enable the position of the rakes to be raised and lowered or controlled automatically depending upon the load imposed on the rake arms.

Another object is to provide a liquid separation or purifying apparatus in which the ballast in the pontoons or floats is automatically controlled to raise or lower the rake arms depending upon the load imposed on the rake arm driving motor units.

Another object is to provide a liquid separation and purifying apparatus such as a thickener with a rotatable rake arm which is driven by parallel and opposite forces applied to the ends of the arms in coplanar directions so that increased horsepower will be developed and the power required to rotate said arm will be diminished.

Another object is to provide a liquid separation and purifying apparatus such as a thickener in which the forces applied at the outer ends of the arms is created by liquid propellers operating in a circular liquid pathway or thickener tank collection trough so that the arm is free to move up and down depending upon the load conditions existing within the tank.

Another object is to provide a liquid separation and purifying apparatus in which the rake arms are driven by yieldingly mounted and gravity biased traction wheels supported on the outer ends of the arms whereby said arms can move freely in a vertical direction depending upon the driving load imposed on the driving motor units.

Another object is to provide a liquid separation and purifying apparatus such as a thickener with propelling units on the rake arms mounted either within the tank or within the overflow liquid pathway surrounding the tank.

Another object is to provide a liquid separation and purifying apparatus having a solid removal outlet centrally arranged which is continuously kept clear and in an operative condition by means of scrapers located on hinged sections of the rake arms and arranged in wiping or scraping engagement with said outlet openings.

Another object is to provide a liquid separation and purifying apparatus in which the rake arm supporting pontoons or floats are provided with automatically operated pumps controlled by reversible motor units to increase or decrease the ballast within the pontoons or float chambers and permit said rake arm to be raised or lowered in accordance with the load conditions existing within the thickener tanks.

Another object is to provide a liquid separating and purifying apparatus of the above-mentioned type in which the central float member is of annular formation and is supported on fixed rollers engageable with the inner periphery of said annular float member to center said rake arm assembly and prevent displacement thereof.

Other objects and advantages of the invention will become apparent during the course of the following description of the accompanying drawings wherein:

Figure 1 is a top elevational view of the liquid purifying and separation apparatus showing the manner in which the rake supporting arms are driven by motor propelling units affixed to the free ends thereof with their propellers in frictional driving engagement with liquid in the overflow trough or pathway.

Figure 2 is a diametrical cross sectional view showing the manner in which the rake supporting arms are buoyantly and floatingly mounted on pontoons or floats attached to the arms.

Figure 3 is a fragmentary diametrical cross sectional view similar to Figure 2, but showing the central structure of the apparatus greatly enlarged to illustrate various structural details such as the annular supporting float chamber, outlet wiping scrapers and supporting foundation construction.

Figure 4 is a horizontal cross sectional view taken on line 4—4 of Figure 3 looking in the direction of the arrows and showing the outlet wiping and cleaning scrapers carried by hinged sections of the rake supporting arm structure.

Figure 5 is a fragmentary cross sectional view taken on line 5—5 of Figure 1 looking in the direction of the arrows and showing the overflow weir in the collection trough outlet.

Figure 6 is a fragmentary side elevational view of another modified form of the invention showing the manner in which a yieldingly mounted motor unit is provided with a traction wheel and is arranged on the rake supporting arm to frictionally urge a circular track on the thickener tank.

Figure 7 is a fragmentary side elevational view of a modified form of the invention showing a floatingly mounted friction driving wheel on the end of the rake supporting arm in frictional driving engagement with a circular portion or rim of the thickener tank.

Figure 8 is a fragmentary end elevational view of the drive structure shown in Figure 7, further illustrating the manner in which the friction driving wheel is floatingly mounted to compensate for various positions of said rake supporting arm.

Figure 9 is a fragmentary side elevational view of another modified form of the invention showing a portion of the thickener tank in section and a frictional driving wheel supported on the free end of the rake supporting arm in driving engagement with the inner peripheral wall of the thickener tank, and Figure 10 is a view illustrating the electrical circuit for the motors and pump.

In the drawings, and more in detail, there is shown one embodiment of the invention in Figures 1 to 5 inclusive, and for the purpose of convenience of illustration a liquid clarifying tank 5 having a sloping bottom wall 6 extends centrally and is integrated with a well 7 forming a foundation for the same. The well 7 is provided with a cylindrical column 8 which is flared outwardly as at 9 having discharge openings 10 diametrically opposed so that the sediment directed toward the center of the tank may be discharged through a Y connection 11 with the discharge ports 10, and thence through the well to a point of discharge through the pipe 12. Liquid to be clarified is conducted to the well 7 by means of a pipe 13 and passes through a horizontal duct 14 and thence upwardly through a stand pipe 15, where it is discharged through nozzles 16 projecting through the cylindrical column 8.

The peripheral edge of the tank is provided with the usual launder 18 having a discharge 19 provided with a baffle or weir 20. The tank generally indicated 5 is located adjacent or in a convenient location to a processing plant in which the liquid to be clarified is a waste product.

Rotatably supported by the column 8 and capable of vertical movement, is a rake arm generally designated 22 and said rake arm includes radially extending trussed structures 23, which have their inner ends connected to an annular float chamber 24. Suitable brace members being provided to connect the arms 22 to the float, and said float includes a bottom wall 25 connected by outer and inner peripheral walls 26 and 27. In addition, arcuately shaped pontoons 28 are secured to the underside of the rake arm 22 to stabilize the free ends of the rake arm. The usual rakes 30 are mounted on the rake arm 22 for directing the sediment on the sloping bottom of the tank 5 toward the central discharge outlets 19.

In addition to the arcuately curved rakes 30, there is provided discharge wipers or scrapers 31 and 32 which are secured to a hinged frame 33 pivotally connected to the lower truss structure of the rake arm as at 34. The scrapers or wipers 32 being arranged at an angle to travel over the outwardly flared portion 9 of the column and maintain the discharge openings 10 in an unobstructed condition. Arms 35 are secured to the frame 33 and extend inwardly to engage an annular limiting stop 36 secured to the cylindrical column 8 so as to prevent the frame 33 from moving downwardly beyond a predetermined limit, but yet allowing said frames 33 to maintain their position when the rake arm 22 is elevated.

The rake arm 22 is thus floatingly mounted within the tank 5, and in order to hold the same in a centered position the cylindrical column 8 is provided with a series of radially extending vertically spaced arms 38 between the free ends of which is mounted guide rollers 39. The guide rollers 39 engage the inner periphery 27 of the float 24 and thus hold the rake arm in position. The free ends of the rake arm 22 extend over the launder 18 as at 40 for supporting electric motors 41 in a suspended position within the launder 18 as clearly shown in Figure 6. Impellers 42 are mounted on the armature shaft of each motor, and the motors are arranged to produce opposite forces at each end of the rake arm. Hence, the liquid overflowing the tank and into the launder 18 provides a liquid pathway into which the impellers 42 are operatively received so that the propelling force of the impellers will rotate the rake arm 22 in the direction of the arrows shown in Figure 1.

Suitable electrical conductors 43 are provided for supplying the motors 41 with electrical energy, and said conductors 43 extend inwardly along the upper surface of the rake arms 22 and are provided with extensions 44 which are connected to a common cable 45 mounted on a hinged arm 46 which carries a pair of contacts 47 for engaging collector rings 48 on the upper wall of the cylindrical column 8, Figure 3. Thus, the electric motors 41 are energized from a suitable source of electrical energy which may be supplied to the collector rings 48 through a cable extending upwardly through the cylindrical column 8 (not shown).

In order to vary the ballast 50 within the annular float chamber 24 a gear pump 51 is mounted therein, and said gear pump is provided with a shaft 52 which is drivingly connected to an electric motor 53 mounted on the top wall of the annular float chamber 24. The motor 53 being of the reversible type such as to enable a combined feed and discharge pipe 54 to fill or discharge the ballast 50 when the pump 51 is operated in reverse directions. The pipe 54 extends externally of the float chamber 24 and projects downwardly into the liquid in the tank 5. The liquid is discharged or fed to the pump 51 through an opening in the casing so that when the motor 53 is rotated in one direction, ballast will be supplied, and when rotated in the opposite direction the ballast will be discharged. The motor 53 is adapted to be regulated by means of an overload switch in circuit with the motors 41 such that when the liquid in the tank 5 is of a heavy consistency and the motors are loaded, the motor 53 will be rotated in a direction to discharge a portion of the ballast in the tank 50 so that the rake arm will be elevated a sufficient distance from the floor of the tank and thereby allow the motors 41 and impellers 42 to effectively drive the rake arm 22. When the liquid within the tank 5 is of a relatively thin consistency, the motors 53 are operated in a reverse direction to cause the pump 51 to feed ballast to the annular float chamber 24. The motor 53 is electrically connected by a cable 56 in circuit with the control switch and thence to the cable 44 so that it will be supplied with electrical energy through the yielding contacts 47 and conductor rings 48.

In the modified form of the invention shown in Figure 6 the liquid tank 5a is provided with a launder 18a and a rake arm 22a as before. The free end of the rake arm is provided with an extension 40a terminating in a downwardly depending arm 57a to which is hinged a bracket 58a as at 59a. An electric motor 60a is mounted on the bracket 58a, and has its armature shaft provided with a traction wheel 61a for engaging an annular track 62a on one of the walls of the launder 18a. A coil spring 63a has one end in engagement with the bracket 58a and its opposite end in engagement with the extension 40a to yieldingly urge the motor and traction wheel 61a into frictional engagement with the annular track 62a.

In the modified form of the invention shown in Figures 7 and 8 the tank 5b is the same as that shown in Figures 1 to 5 inclusive, and is provided with a peripheral launder 18b likewise as before. The free ends of the rake arm 22b are provided with brackets 64b having spaced slide bearings 65b for slidably receiving a fork 66b. The lower end of the fork 97b is angled slightly and terminates in spaced fork arms 68b between which is journaled a rubber tired friction drive wheel 70b. A pulley 71b is mounted on the axle shaft 72b of the wheel, and is adapted to be driven by an endless belt 73b trained over a corresponding pulley 76b on the armature shaft of a motor 77b. The motor is attached to the fork 66b by means of a suitable bracket 78b. Thus, it will be seen, that the rubber tired wheel 70b is in frictional driving engagement with the upper edge of one of the vertical walls of the launder 18b so as to drive the rake arm 22b in much the same manner as the propellers 22 (Figs. 1 to 5 inclusive), and the friction wheel 61a (Fig. 6).

In the modified form of the invention shown in Figure 9 the liquid tank 5c is identical in construction to that shown in Figures 1 to 5, and is provided with a peripheral launder 18c for collecting the overflow liquid in a clarified condition and discharging it. The rake arm 22c is provided with a forked extension 80c having an axle shaft 81c for supporting a friction driving wheel 82c. A drive pulley 83c has its hub affixed to the shaft 81c and is adapted to be driven by means of a belt 84c drivingly connected to an electric motor (not shown) mounted on the rake arm 22c. The friction wheel 82 rotates about a vertical axis and is in frictional driving engagement with the inner peripheral wall of the tank 5.

Referring to the Figure 10 of the drawings, there is shown a wiring circuit for the system wherein the electrical conductors 43 are provided for supplying the pair of electric motors 41 with electrical energy from a suitable source of supply. Connected in parallel with the motors 41 is an overload relay 85 and an underload relay 86. When the load on the electric motors is increased, the current drawn by that motor increases proportionally. Thus, when the motors 41 are overloaded, the relay 85 is actuated thereby supplying electrical energy to the motor 53 through contacts 87, 88, and terminal 90, thereby causing the pump 51 to exhaust fluid from the ballast tank until the relay 85 is de-energized by the return of a normal load on the motors 41. In the case of an underload, the relay 86 is energized permitting the flow of current through contacts 87, 89, and terminal 91, thereby allowing the motor 53 to drive the pump 51 until a normal load is again reached. It is to be noted that the motor 53 is of the reversible type so that when current is supplied through terminal 91, the motor rotates in one direction, and when the current is supplied to terminal 90, rotation is caused in the opposite direction.

I claim:

1. In a liquid separation and purifying apparatus, a circular tank having a bottom wall sloping towards a center sediment removal trough, radially extending rake arms mounted in said tank so as to rotate about the center of the tank, arcuately shaped agitator rake members on said rake arms transversely thereof for directing sludge and sediment toward the center of said tank into the said sediment removal trough, a float member for said rake arms for supporting said rake members various distances from the bottom wall of said tank, a frame hinged at the end of the rake arms next to the center of the tank in parallel relation to said rake arms, a scraper element on the inner end of each frame at an angle thereto, a plurality of wiper elements carried by each of said frames inwardly of the scraper element, means connected to each of said frames to limit the downward movement of said frames, a launder at the outer periphery of the tank providing a circular marginal pathway about the tank, and means fixed to the outer ends of the rake arms and coacting with said pathway for the rotation of said radial rake arms.

2. In a liquid separation and purifying apparatus as in claim 1, the provision of motor units on the outer ends of said rake arms for operating the means for causing the rotation of said rake arms and means is provided for varying the ballast in said float member to cause said rake arms to assume different positions with respect to the sloping surface of said bottom wall.

3. In a liquid separation and purifying apparatus as in claim 1 wherein the said marginal pathway comprises the peripheral wall of the tank and the means engaging the pathway for the rotation of said rake arms comprises a friction driving wheel in driving engagement with said peripheral wall and a motor for driving said friction wheel and said motor and friction wheel are floatingly mounted on said rake arms to compensate for the various positions of the said rake arms.

4. In a liquid separation and purifying apparatus as in claim 1 wherein a round vertical support is mounted in the center of the tank, and said float member is annular in cross section and encircles the said support, rollers carried by said support engageable with the inner peripheral surface of said annular float member to center said float member, pump means for supplying liquid ballast to said float to vary the height thereof above the bottom wall of said tank, and said circular pathway is provided by the overflow liquid in said launder and impellers are mounted on the outer ends of said rake arms for engagement with said liquid to cause the rotation of said rake arms.

5. In a liquid separation and purifying apparatus as in claim 1, wherein a round vertical support is mounted in the center of said tank, and said float member is of annular form and encircles the said support, rollers are carried by said support and are engageable with the inner peripheral surface of said annular float member to center said float member in the tank, pump means are provided for supplying ballast liquid to said float to vary the height thereof above the bottom wall of the tank, a motor is mounted on the outer end of each of said arms and a yieldingly mounted friction driving wheel is mounted on the outer end of each of said rake arms, and the said marginal pathway comprises the peripheral wall of said tank and said driving wheel is in frictional driving engagement with said peripheral wall.

PAUL AIVIE CURTIS.

REFERENCES CITED

The following references are of record in the file of this patent:

UNITED STATES PATENTS

| Number | Name | Date |
| --- | --- | --- |
| Re. 20,761 | Pruss | June 14, 1938 |
| 1,356,608 | Dorr | Oct. 26, 1920 |
| 1,734,044 | Orr | Nov. 5, 1929 |
| 1,972,584 | Easterday | Sept. 4, 1934 |
| 2,141,133 | Gibbs | Dec. 20, 1938 |